US012740850B2

(12) United States Patent
Kim et al.

(10) Patent No.: US 12,740,850 B2
(45) Date of Patent: Sep. 22, 2026

(54) FACIAL SHAPE CLASSIFICATION METHOD AND DENTURE DESIGN DEVICE THEREFOR

(71) Applicant: OSSTEM IMPLANT CO., LTD., Seoul (KR)

(72) Inventors: Young Seok Kim, Anyang-si (KR); In Ho Cho, Seoul (KR); Kyoo Ok Choi, Seoul (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 369 days.

(21) Appl. No.: 18/565,877

(22) PCT Filed: Jul. 12, 2022

(86) PCT No.: PCT/KR2022/010119
§ 371 (c)(1),
(2) Date: Nov. 30, 2023

(87) PCT Pub. No.: WO2023/018021
PCT Pub. Date: Feb. 16, 2023

(65) Prior Publication Data

US 2024/0252290 A1 Aug. 1, 2024

(30) Foreign Application Priority Data

Aug. 13, 2021 (KR) ........................ 10-2021-0107480

(51) Int. Cl.
*A61C 13/00* (2006.01)
*A61C 9/00* (2006.01)

(52) U.S. Cl.
CPC ........ *A61C 13/0004* (2013.01); *A61C 9/0046* (2013.01)

(58) Field of Classification Search
CPC .......................... A61C 13/0004; A61C 9/0046
See application file for complete search history.

(56) References Cited

U.S. PATENT DOCUMENTS 6,261,248 B1 * 7/2001 Takaishi ................. A61B 5/103 382/118
8,092,220 B2 * 1/2012 Wiedmann ......... A61C 13/0004 433/202.1

(Continued)

FOREIGN PATENT DOCUMENTS

EP 3047817 B1 7/2016
JP 2011-521767 A 7/2011

(Continued)

OTHER PUBLICATIONS

Extended European Search Report Issued on Jul. 28, 2025, in Counterpart European Patent Application No. 22856023.1 (8 Pages in English).

(Continued)

*Primary Examiner* — Ramsey Refai
(74) *Attorney, Agent, or Firm* — NSIP Law

(57) ABSTRACT

Disclosed are a facial shape classification method and a denture design device therefor. A facial shape classification method according to an embodiment and a denture design device therefor classify and provide an artificial tooth shape according to the facial shape of a patient, and thus can minimize a user's manipulation, reduce inconvenience, and increase a patient's aesthetic satisfaction.

8 Claims, 6 Drawing Sheets

(56) References Cited

U.S. PATENT DOCUMENTS

| | | | | |
|---|---|---|---|---|
| 8,386,061 | B2 * | 2/2013 | Violante | A61C 9/0046 700/98 |
| 8,423,335 | B2 * | 4/2013 | Methot | A61C 19/04 703/6 |
| 8,706,672 | B2 * | 4/2014 | Malfliet | A61C 9/0053 264/16 |
| 8,992,217 | B2 * | 3/2015 | Cho | A61B 5/1077 433/68 |
| 9,155,599 | B2 * | 10/2015 | Thompson | A61C 13/0004 |
| 9,291,834 | B2 * | 3/2016 | Silva | A61B 3/0025 |
| 9,411,910 | B2 * | 8/2016 | Methot | A61C 5/77 |
| 10,896,761 | B2 * | 1/2021 | Stone-Collonge | G16H 50/50 |
| 11,006,858 | B2 | 5/2021 | Chang et al. | |
| 11,263,788 | B2 | 3/2022 | Kim | |
| 11,278,380 | B2 * | 3/2022 | Amato | A61C 13/082 |
| 11,389,131 | B2 * | 7/2022 | Tuzoff | G06T 7/11 |
| 12,042,350 | B2 * | 7/2024 | Jang | G06V 40/168 |
| 12,062,170 | B2 * | 8/2024 | Ezhov | G06T 7/0012 |
| 2005/0089822 | A1 * | 4/2005 | Geng | A61C 13/0004 433/167 |
| 2007/0099147 | A1 * | 5/2007 | Sachdeva | A61C 9/0046 433/24 |
| 2010/0009317 | A1 * | 1/2010 | Wiedmann | A61C 13/0004 433/215 |
| 2010/0049351 | A1 * | 2/2010 | Monkmeyer | A61C 13/0004 700/118 |
| 2010/0076581 | A1 | 3/2010 | Violante et al. | |
| 2010/0145898 | A1 * | 6/2010 | Malfliet | G06V 20/20 703/1 |
| 2010/0332253 | A1 * | 12/2010 | Adusimilli | A61C 11/00 705/2 |
| 2014/0180643 | A1 * | 6/2014 | Pacinelli | G16H 50/50 703/1 |
| 2019/0090784 | A1 | 3/2019 | Chang et al. | |
| 2019/0117337 | A1 | 4/2019 | Tsai et al. | |
| 2020/0000552 | A1 | 1/2020 | Mednikov et al. | |
| 2020/0146646 | A1 * | 5/2020 | Tuzoff | A61B 6/463 |
| 2021/0085238 | A1 | 3/2021 | Schnabel et al. | |
| 2021/0142529 | A1 | 5/2021 | Kim | |
| 2024/0130833 | A1 * | 4/2024 | Hultgren | A61K 6/90 |

FOREIGN PATENT DOCUMENTS

| | | | |
|---|---|---|---|
| KR | 10-2011-0001278 | A | 1/2011 |
| KR | 10-1067942 | B1 | 9/2011 |
| KR | 10-1802917 | B1 | 11/2017 |
| KR | 10-2057671 | B1 | 12/2019 |
| KR | 10-2021-0056141 | A | 5/2021 |
| KR | 10-2021-0069172 | A | 6/2021 |
| WO | WO 2018/230873 | A1 | 12/2018 |

OTHER PUBLICATIONS

Kassab et al. "The selection of maxillary anterior teeth width in relation to facial measurements at different types of face form" *Al-Rafidain Dental Journal* vol. 5 Issue 1, 2005 (pp. 15-23).

Vasanth Kumar et al. "The Science of Anterior Teeth Selection for a Completely Edentulous Patient: A Literature Review" *Indian Prosthodontic Society*, Apr. 30, 2011 (pp. 7-13).

Boujoual et al. "Correlation Between the Form of the Maxillary Central Incisor and the Inverted Form of the Face (Part Ii: Statistical Study On a Moroccan Sample)" *International Journal of Information Research and Review* vol. 5 Issue 10, Oct. 2018 (pp. 5770-5773).

Office Action Issued on Feb. 27, 2023 in Counterpart Korean Patent application No. 10-2021-0107480 (4 pages Korean).

Office Action Issued on Jul. 27, 2023 in Counterpart Korean Patent application No. 10-2021-0107480 (3 Pages Korean).

Chinese Office Action Issued on Apr. 23, 2026, in Counterpart Chinese Patent Application No. 202280043262.9 (7 Pages in English, 7 Pages in Chinese).

* cited by examiner

FIG. 4

| ARTIFICIAL TOOTH SHAPE | FACIAL SHAPE |
| --- | --- |
| **Square** | ①=②=③, ①<②=③, ①>②=③,<br>①=②>③, ①=②<③ |
| **Tapering** | ①>②>③, ①<②<③, ①>②<③ |
| **Ovoid** | ①<②>③ |

FACIAL SHAPE CLASSIFICATION METHOD AND DENTURE DESIGN DEVICE THEREFOR

CROSS REFERENCE TO RELATED APPLICATIONS

This application is a U.S. National Stage Application of International Application No. PCT/KR2022/010119, filed on Jul. 12, 2022, which claims the benefit under 35 USC 119(a) and 365(b) of Korean Patent Application No. 10-2021-0107480, filed on Aug. 13, 2021, in the Korean Intellectual Property Office, the entire disclosure of which is incorporated herein by reference for all purposes.

TECHNICAL FIELD

The present invention relates to dental image processing technology, and more specifically, to technology for designing a denture using dental images.

BACKGROUND ART

Restoration using complete dentures in edentulous patients is a treatment concept entirely different from restorative treatment of natural teeth. A user must set everything, including the positions of artificial teeth, and all teeth move as one unit, with a constant risk of dislodgment. When making such complete dentures, if the optimal artificial teeth are selected and placed, it may become easier to make occlusal adjustments for complete denture patients.

Currently, one method to choose appropriate artificial teeth is for the user to visually inspect the patient's facial photos or model data and make a selection. In this case, the method relies on the user's experience rather than precise data. The conventional method that relies on user experience is cumbersome, as it requires the user to choose the shape of artificial teeth each time, and the results may vary depending on the user's proficiency.

DISCLOSURE

Technical Problem

According to one embodiment, the present invention relates to a facial shape classification method that can select the optimal artificial tooth when designing a complete denture, minimize user's manipulation, and increase the patient's aesthetic satisfaction, and a denture design device therefor.

Technical Solution

A facial shape classification method according to an embodiment includes acquiring facial data of a patient, extracting a plurality of landmarks from the acquired facial data, classifying a facial shape of the patient using distances between the plurality of extracted landmarks, and classifying and providing an artificial tooth shape of the patient according to the classified facial shape.

The plurality of landmarks may include at least one of endpoints on both sides of the one-third portion of a forehead area, tragus points on both sides of a face, or gonion points on both sides of the face in the facial data.

In the extracting of the plurality of landmarks, at least one of endpoints on both sides of the one-third portion of a forehead area, tragus points on both sides of a face, or gonion points on both sides of the face in the facial data may be extracted, and the classifying of the facial shape of a patient may include calculating a first distance of a first line segment connecting endpoints on both sides of the one-third portion of the forehead area in the facial data, a second distance of a second line segment connecting the tragus points on both sides, and a third distance of a third line segment connecting the gonion points on both sides and classifying the facial shape of the patient based on a comparison of the calculated first, second, and third distances.

In the classifying and providing of the artificial tooth shape of a patient, the artificial tooth shape may be classified as at least one of square, tapering, or ovoid, or a combination of at least two thereof according to the facial shape.

In the classifying and providing of the artificial tooth shape of a patient, when the facial shape is such that first distance=second distance-third distance, or first distance<second distance=third distance, or first distance>second distance-third distance, or first distance=second distance<third distance, the artificial tooth shape may be classified as square; when the facial shape is such that first distance>second distance>third distance, or first distance<second distance<third distance, or first distance>second distance<third distance, the artificial tooth shape may be classified as tapering; and when the facial form is such that first distance<second distance>third distance, the artificial tooth shape may be classified as ovoid, wherein the first distance may be a distance of the first line segment connecting the endpoints on both sides of the one-third portion of the forehead area in the facial data, the second distance may be a distance of the second line segment connecting the tragus points on both sides, and the third distance may be a distance of the third line segment connecting the gonion points on both sides.

The facial shape classification method may further include, when there are multiple classified artificial tooth shapes, providing the multiple artificial tooth shapes, receiving a specific artificial tooth shape selected from among the multiple provided artificial tooth shapes through a user action, and providing the selected artificial tooth shape.

The facial shape classification method may further include receiving a manipulation signal based on a user action for the provided artificial tooth shape, and modifying and providing the artificial tooth shape.

The modifying and providing of the artificial tooth shape may include, when providing a first artificial tooth shape, vertically dividing the first artificial tooth shape into right and left halves while displaying a dividing line, and, in response to selecting either the left half or the right half through a manipulation signal based on a user action, providing a modified artificial tooth shape in which, when the right half is selected, the right half is modified to a second artificial tooth shape, or, when the left half is selected, the left half is modified to a third artificial tooth shape.

The modifying and providing of the artificial tooth shape may include, in response to selecting a specific artificial tooth shape through a user manipulation, displaying an artificial tooth replacement list on a screen and in response to selecting a specific artificial tooth shape from the artificial tooth replacement list through a user manipulation, modifying the artificial tooth shape to the selected artificial tooth shape and providing the modified artificial tooth shape.

A denture design device according to another embodiment includes a data acquisition unit configured to acquire facial data of a patient, a control unit configured to extract a plurality of landmarks from the acquired facial data, classify a facial shape of the patient using distances between the plurality of extracted landmarks, and classify an artificial tooth shape of the patient according to the classified facial shape, and an output unit configured to provide the classified artificial tooth shape.

Advantageous Effects

According to a facial shape classification method in accordance with an embodiment and a denture design device therefor, it is possible to minimize user's manipulation by automatically classifying and providing the shape of an artificial tooth in a complete denture production.

In addition, by considering the individual facial shape of a patient to determine and provide the shape of artificial teeth, accuracy and patient aesthetic satisfaction may be enhanced.

Moreover, allowing a user to modify the provided patient's facial shape increases user convenience.

DESCRIPTION OF DRAWINGS

FIG. 4 is a table showing facial shape-specific artificial tooth shapes classified according to an embodiment of the present invention.

MODE OF THE INVENTION

Figure 1:
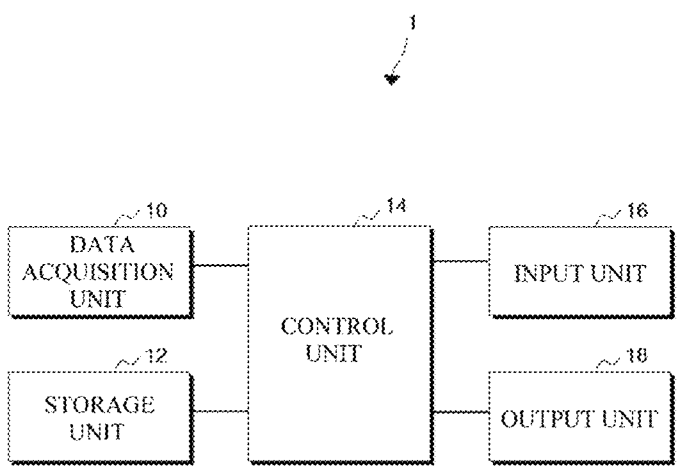
FIG. 1 is a diagram illustrating a configuration of a denture design device according to an embodiment of the present invention.

The advantages and features of the present invention and the manner of achieving the advantages and features will become apparent with reference to embodiments described in detail below together with the accompanying drawings. However, the present invention may be implemented in many different forms and should not be construed as being limited to the embodiments set forth herein, and the embodiments are provided such that this disclosure will be thorough and complete and will fully convey the scope of the present invention to those skilled in the art, and the present invention is defined only by the scope of the appended claims. Throughout the entire specification, the same or like reference numerals designate the same or like elements.

In describing the example embodiments, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms used herein should follow contexts disclosed herein.

Hereinafter, embodiments of the present invention will be described in detail with reference to the accompanying drawings. However, the example embodiments may be modified in various different forms, and the scope of the present invention is not limited to the example embodiments described below. The example embodiments are provided to more completely describe the present invention to those skilled in the art.

FIG. 1 is a diagram illustrating a configuration of a denture design device according to an embodiment of the present invention.

A denture design device 1 is an electronic device capable of executing image processing programs. Examples of the electronic device include personal computers (PCs), notebook computers, tablet computers, smartphones, mobile phones, and the like. Medical image processing programs include design programs, scanning programs, CAD programs, and the like. These medical image processing programs may be denture design programs for producing complete dentures for edentulous patients, but they may also be applied to other general medical image processing programs. Hereinafter, for the convenience of description, a dental design program will be described as an example, but if image processing is possible, other programs are applicable.

Referring to FIG. 1, the denture design device 1 according to one embodiment includes a data acquisition unit 10, a storage unit 12, a control unit 14, an input unit 16, and an output unit 18.

The data acquisition unit 10 acquires dental image data from teeth, including the patient's damaged teeth. The dental image data may include facial shape data such as the patient's facial photos, facial scan data, and the like.

The storage unit 12 stores data, such as information necessary for the operation of the denture design device 1, information generated during its operation, and the like. For example, individual patient scan data may be stored in the storage unit 12 and provided to the control unit 14. The storage unit 12 may store maxillary and mandibular dental image data of individual patients, and provide dental image data of a specific patient to the control unit 14. In addition, artificial tooth shape information for each of the pre-classified facial shapes may be stored in the storage unit 12.

The control unit 14 designs a complete denture under the control of a computer program. The control unit 14 according to the embodiment determines the shape of an artificial tooth for complete denture design. Here, the shape includes size.

As an example of determining the shape of an artificial tooth by the control unit 14, a plurality of landmarks are extracted from the facial data obtained through the data acquisition unit 10. The plurality of extracted landmarks serve as anatomical reference points in the facial data. For example, these landmarks may include endpoints on both sides of the one-third portion of the forehead area, tragus points on both sides of the face, and gonion points on both sides of the face. The endpoints on both sides of the one-third portion of the forehead area refer to endpoints on both sides of a portion that represents one-third of the entire forehead area (from the glabella to the trichion) when it is equally trisected vertically. The tragi on both sides refer to the cartilaginous prominences situated anteriorly to the entrance of the external auditory canal. The gonia on both sides refer to the angular areas at the rear bottom of the mandible. Examples of the landmarks will be described below with reference to FIG. 3.

Then, the control unit 14 classifies the patient's facial shape using the distances between the extracted landmarks. For example, the control unit 14 calculates a first distance, a second distance, and a third distance between the landmarks and classifies the patient's facial shape based on the comparison of the calculated first, second, and third distances. Here, the first distance is the distance of a first line segment connecting both endpoints of the one-third portion of the forehead area in the facial data. The second distance is the distance of a second line segment connecting both tragus points. The third distance is the distance of a third line segment connecting both gonion points. Examples of the facial shape classification will be described below with reference to FIG. 3.

Subsequently, the control unit 14 classifies the patient's artificial tooth shape according to the classified facial shape and provides it through the output unit 18. For this purpose, artificial tooth shapes matching the facial shapes are pre-stored in the storage unit 12, and the control unit 14 selects a specific artificial tooth shape that matches the classified facial shape from the multiple artificial tooth shapes stored in the storage unit 12.

The control unit 14 may classify the artificial tooth shape as at least one of square, tapering, or ovoid, or a combination of at least two thereof according to the facial shape. For example, the artificial tooth shape may be classified as square, tapering, ovoid, square-tapering, tapering-ovoid, ovoid-square, or square-tapering-ovoid.

For example, if the facial shape is such that first distance=the second distance=the third distance, or first distance<second distance=third distance, or first distance>second distance=third distance, or first distance=second distance<third distance, the control unit 14 may classify the artificial tooth shape as square. If the facial shape is such that first distance>second distance>third distance, or first distance<second distance<third distance, or first distance>second distance<third distance, the control unit 14 may classify the artificial tooth shape as tapering. If the facial form is such that first distance<second distance>third distance, the control unit 14 may classify the artificial tooth shape as ovoid. Examples of the facial shape classification will be described below with reference to FIG. 4. When the first distance, the second distance, or the third distance is equal to each other, it may imply that if the difference between distances falls within a predetermined margin of error, they are considered equal. For example, if the control unit 14 detects a difference of less than 5 mm between two distances, it may be considered that these distances are equal. In another example, the control unit 14 may determine whether the distances are equal to each other based on a comparison of distances after truncating decimal places in centimeters when comparing distances.

If there are multiple classified artificial tooth shapes, the control unit 14 may provide multiple artificial tooth shapes through the output unit 18. When the user selects a specific artificial tooth shape through user input via the input unit 16, the control unit 14 may provide the selected artificial tooth shape through the output unit 18.

When the input unit 16 receives a user selection signal for modification to the artificial tooth shape, the control unit 14 may modify the artificial tooth shape, and the output unit 18 may display the modified artificial tooth shape.

For example, when providing a first artificial tooth shape, the control unit 14 divides the first artificial tooth shape vertically into right and left halves and displays the divided first artificial tooth shape and the dividing line through the output unit 18. In this case, if the user selects either the left or right half through a manipulation signal based on a user action via the input unit 16, the control unit 14 provides the modified artificial tooth shape in which, when the right half is selected, the right half is modified to a second artificial tooth shape, or, when the left half is selected, the left half is modified to a third artificial tooth shape, through the output unit 18. An embodiment of this will be described below with reference to FIG. 5.

In another example, when the artificial tooth shape is selected by a user action, the control unit 14 displays an artificial tooth replacement list on a screen through the output unit 18. In this case, if the input unit 16 receives a specific artificial tooth shape that the user selects from the artificial tooth replacement list, the control unit 14 modifies the artificial tooth shape to the selected one and provides the modified artificial tooth shape through the output unit 18. An embodiment of this will be described below with reference to FIG. 6.

The input unit 16 receives a user manipulation signal. For example, the input unit 16 receives the manipulation signal based on a user action (e.g., a mouse click) for modifying the artificial tooth shape that is performed for the artificial tooth shape displayed as a virtual graphical object on the screen through the output unit 18.

The output unit 18 displays data on the screen and displays a simulation process conducted through the control unit 14. In this case, the artificial tooth shape designed by the control unit 14 may be displayed on the screen and output through a 3D printer.

Figure 2:
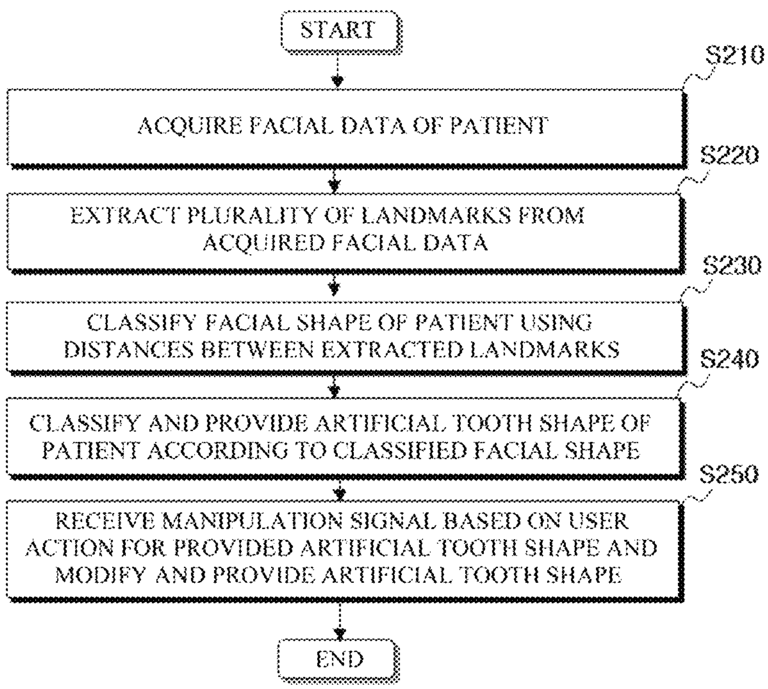
FIG. 2 is a flowchart illustrating a facial shape classification method according to an embodiment of the present invention.

FIG. 2 is a flowchart illustrating a facial shape classification method according to an embodiment of the present invention.

Referring to FIGS. 1 and 2, the denture design device 1 acquires the patient's facial data (S210). Subsequently, the denture design device 1 extracts a plurality of landmarks from the acquired facial data (S220). The plurality of landmarks may be at least one of endpoints on both sides of the one-third portion of the forehead area, tragus points on both sides of the face, or gonion points on both sides of the face in the facial data.

Thereafter, the denture design device 1 classifies the facial shape of a patient using the distances between the extracted landmarks (S230). In the classifying of the facial shape of a patient (S230), the denture design device 1 may calculate the first distance of the first line segment connecting both endpoints of one-third of the forehead area, the second distance of the second line segment connecting the tragus points on both sides, and the third distance of the third line segment connecting the gonion points on both sides. Then, the denture design device may 1 classify the patient's facial shape based on the comparison of the calculated first, second, and third distances.

Subsequently, the denture design device 1 classifies and provides the patient's artificial tooth shape according to the classified facial shape (S240).

In the classifying of the patient's artificial tooth shape (S240), the denture design device 1 may classify the artificial tooth shape as at least one of square, tapering, or ovoid, or a combination of at least two thereof according to the facial shape. For example, if the facial shape is such that first distance=second distance-third distance, or first distance<second distance-third distance, or first distance>second distance-third distance, or first distance=second distance<third distance, the denture design device 1 may classify the artificial tooth shape as square. If the facial shape is such that first distance>second distance>third distance, or first distance<second distance<third distance, or first distance>second distance<third distance, the denture design device 1 may classify the artificial tooth shape as tapering. If the facial form is such that first distance<second distance>third distance, the denture design device 1 may classify the artificial tooth shape as ovoid.

In the classifying of the artificial tooth shape (S240), if there are multiple classified artificial tooth shapes, the denture design device 1 may provide the multiple artificial tooth shapes, receives a specific artificial tooth shape selected from among the multiple provided artificial tooth shapes through a user manipulation, and provide the selected artificial tooth shape.

Furthermore, the denture design device 1 may receive a manipulation signal based on the user action for the provided artificial tooth shape and modify and provide the artificial tooth shape (S250).

In the modifying of the artificial tooth shape (S250), when providing a first artificial tooth shape, the denture design device 1 may divide the first artificial tooth shape vertically into right and left halves and display the dividing line. In this case, if either the left or right half is selected by a manipulation signal based on the user action, the dental design device 1 may provide the modified artificial tooth shape in which, when the right half is selected, the right half is modified to a second artificial tooth shape, or, when the left half is selected, the left half is modified to a third artificial tooth shape.

In the modifying of the artificial tooth shape (S250), the denture design device 1 may display an artificial tooth replacement list when the user selects a specific artificial tooth shape. In this case, if the user selects a specific artificial tooth shape from the artificial tooth replacement list, the artificial tooth shape may be modified to the selected artificial tooth shape and provided.

Figure 3:
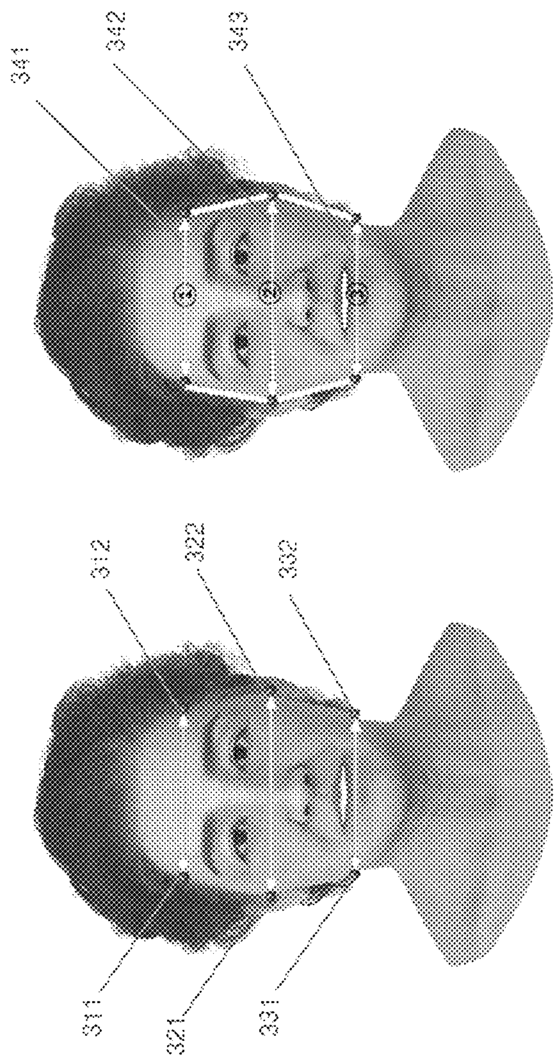
FIG. 3 illustrates facial shapes classified according to an embodiment of the present invention.

FIG. 3 illustrates facial shapes classified according to an embodiment of the present invention.

Referring to FIGS. 1 and 3, the denture design device 1 classifies the patient's facial shape using the plurality of landmarks extracted from the facial data.

As shown in FIG. 3, the denture design device 1 may extract six landmarks from the patient's facial data. These six landmarks may include, for example, endpoints 311 and 312 on both sides of the one-third portion of the forehead area, tragi 321 and 322 on both sides of the face, and gonia 331 and 332 on both sides of the face. The endpoints 311 and 312 on both sides of the one-third portion of the forehead area refer to endpoints on both sides of a portion that represents one-third of the entire forehead area when it is equally trisected vertically. The tragi 321 and 322 on both sides refer to the cartilaginous prominences situated anteriorly to the entrance of the external auditory canal. The gonia 331 and 332 on both sides refer to the angular areas at the rear bottom of the mandible.

The denture design device 1 calculates a distance of a line segment created by connecting two points of the landmarks of the facial shape. For example, the denture design device 1 calculates the first distance ① 341 of the first line segment connecting the endpoints 311 and 312 on both sides of the one-third portion of the forehead area, the second distance ② 342 of the second line segment connecting the tragi 321 and 322 on both sides, and the third distance ③ 343 of the third line segment connecting the gonia 331 and 332 on both sides.

Subsequently, the denture design device 1 may classify the patient's facial shape based on the comparison of the calculated first distance ① 341, second distance ② 342, and third distance ③ 343. For example, the facial shape based on the comparison of the first distance ① 341, the second distance ② 342, and the third distance ③ 343 may be classified into nine types, such as ①=2=③, ①=②>③, ①=②<③, ①>②=③, ①>②>③, ①>②<③, ①<②>③, ①<②<③, and ①<②=③.

FIG. 4 is a table showing facial shape-specific artificial tooth shapes classified according to an embodiment of the present invention.

Referring to FIGS. 1 and 4, the denture design device 1 classifies the artificial tooth shape according to the patient's facial shape and provides it to the user. For this purpose, the denture design device 1 pre-classifies and stores artificial tooth shapes matching the facial shapes in the storage unit 12. When the facial shape is determined, the denture design device 1 searches for the artificial tooth shape in the storage unit 12 that matches the classified facial shape and provides it. For example, as shown in FIG. 4, the denture design device 1 classifies nine facial shapes into three artificial tooth shapes. The three artificial tooth shapes include square, tapering, and ovoid. For example, if the facial shape is ①=②=③, or ①<②=③, or ①>②=③, or ①=②>③, or ①=②<③, the denture design device 1 may classify the artificial tooth shape as square. If the facial shape is ①>②>③, or ①<②<③, or ①>②<③, the denture design device 1 may classify the artificial tooth shape as tapering. If the facial shape is ①<②>③, the denture design device 1 may classify the artificial tooth shape as ovoid.

In another example, in addition to the aforementioned three shapes, the artificial tooth shapes may be classified into other types, such as four, seven categories, or the like. For example, artificial tooth shapes may be classified into four categories, including square, tapering, ovoid, and square-ovoid. Similar to the combination of square and ovoid, at least two artificial tooth shapes may be combined, resulting in artificial tooth shape classifications such as square-ovoid, square-tapering, square-tapering-ovoid, and the like.

The criteria for classifying artificial tooth shapes based on facial shapes are pre-set and stored in the storage unit 12, and they may be modified by the user.

Figure 5:
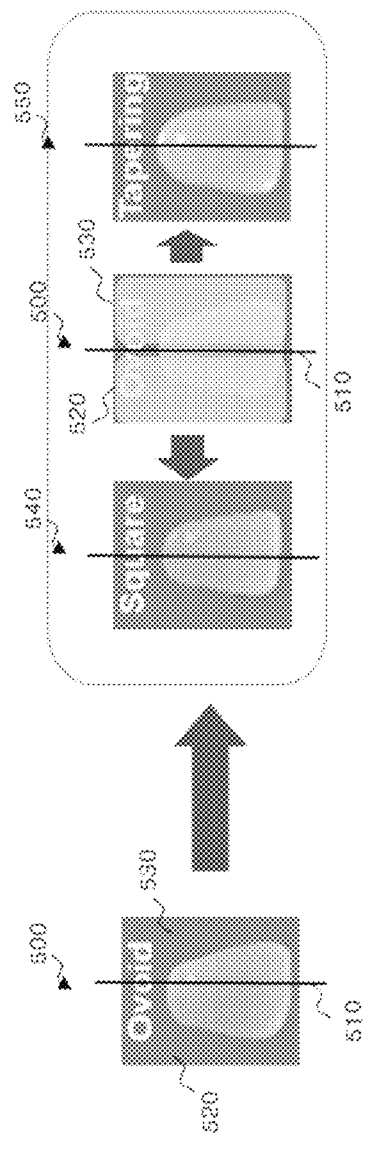
FIG. 5 is a diagram illustrating an example of user modification to the shape of an artificial tooth provided according to an embodiment of the present invention.

FIG. 5 is a diagram illustrating an example of user modification to the shape of an artificial tooth provided according to an embodiment of the present invention.

Referring to FIGS. 1 and 5, the user may modify an artificial tooth shape provided by the denture design device 1. For example, the denture design device 1 vertically divides the provided artificial tooth shape 500 into a left half 520 and a right half 530, and displays a dividing line 510. In this case, when the user selects either the left half or the right half through a manipulation signal based on a user action (e.g., a mouse click), the right half may be used as a "next" button, while the left half may be used as a "previous" button. For example, in the case where the artificial tooth shapes include square, ovoid, and tapering shapes and the denture design device 1 provides an ovoid shape 500, if the user selects the left half 520 of the provided ovoid shape 500 based on the dividing line 510, the denture design device 1 modifies the artificial tooth shape from the ovoid shape 500 to a square shape 540 and provides the modified shape. Conversely, if the user selects the right half 530 of the provided ovoid shape 500 based on the dividing line 510, the denture design device 1 modifies the artificial tooth shape from the ovoid shape 500 to a tapering shape 550 and provides the modified shape. When the user makes modifications, the denture design device 1 may display both the original artificial tooth shape 500 and the modified artificial tooth shape 540 or 550 in a visually distinguished manner. In addition, when the left half 520 or the right half 530 based on the dividing line of the artificial tooth shape 500 is selected, the denture design device 1 may display the selected half in a visually distinguished manner.

In the example shown in FIG. 5, when there are three different artificial tooth shapes, the artificial tooth shape may be modified with a single selection action (e.g., a click) of the user.

As shown in FIG. 5, the artificial tooth shape may be modified through the user action for selecting either the left or right side of the provided artificial tooth. However, an additional graphical user interface may be provided around the provided artificial tooth for user selection and the artificial tooth shape may be modified based on the user's selection through the provided graphical user interface.

Figure 6:
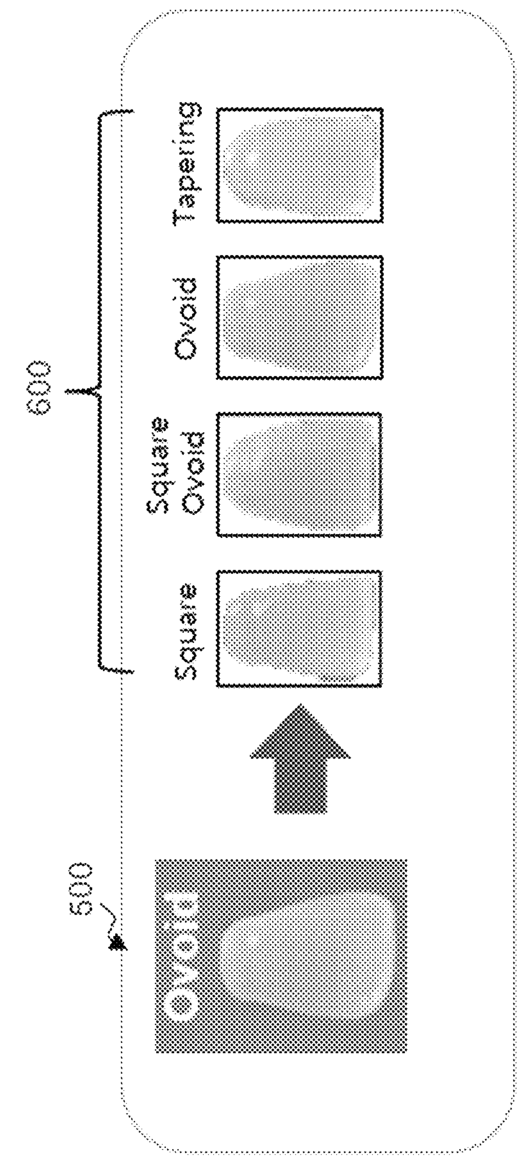
FIG. 6 is a diagram illustrating an example of user modification to the shape of an artificial tooth provided according to another embodiment of the present invention.

FIG. 6 is a diagram illustrating an example of user modification to the shape of an artificial tooth provided according to another embodiment of the present invention.

Referring to FIGS. 1 and 6, even when there are four or more classification criteria for artificial tooth shapes, the user may still make modifications. For example, when there are at least four classification criteria for artificial tooth shapes, if a user selects a specific artificial tooth shape, for example, an ovoid shape 500, through a user action (e.g., a click) the denture design device 1 displays an artificial tooth replacement list 600 on a screen. In this case, when the user selects a specific artificial tooth shape from the artificial tooth replacement list 600 through a user action (e.g., a click), the denture design device 1 may modify the artificial tooth shape to the artificial tooth shape selected by the user and provide the modified artificial tooth shape.

In the example shown in FIG. 6, when there are four or more artificial tooth shapes, the artificial tooth shape may be modified with two selection actions (e.g., clicks) of the user.

While the present invention has been particularly described with reference to exemplary embodiments, it will be understood by those skilled in the art that various changes in form and details may be made without departing from the spirit and scope of the present invention. Therefore, the exemplary embodiments should be considered in a descriptive sense only and not for purposes of limitation. The scope of the present invention is defined not by the detailed description of the present invention but by the appended claims, and encompasses all modifications and equivalents that fall within the scope of the appended claims and will be construed as being included in the present invention.

The invention claimed is:

1. A facial shape classification method performed by a denture design device, the method comprising:

acquiring facial data of a patient;

extracting a plurality of landmarks from the acquired facial data, the plurality of landmarks including endpoints on both sides of a one-third portion of a forehead area, tragus points on both sides of a face, and gonion points on both sides of the face in the facial data;

calculating a first distance of a first line segment connecting the endpoints on both sides of the one-third portion of the forehead area in the facial data, a second distance of a second line segment connecting the tragus points on both sides of the face, and a third distance of a third line segment connecting the gonion points on both sides of the face;

classifying the facial shape of the patient based on a comparison of the calculated first, second, and third distances;

classifying an artificial tooth shape of the patient according to the classified facial shape; and displaying, on a screen of the denture design device, an artificial tooth shape classified according to the classified facial shape and a simulation process conducted through a control unit of the denture design device, and outputting the artificial tooth shape through a three-dimensional printer.

2. The facial shape classification method of claim 1, wherein in the classifying of the artificial tooth shape of a patient, the artificial tooth shape is classified as at least one of square, tapering, or ovoid, or a combination of at least two thereof according to the facial shape.

3. The facial shape classification method of claim 1, wherein in the classifying of the artificial tooth shape of a patient, when the facial shape is such that first distance=second distance=third distance, or first distance<second distance=third distance, or first distance>second distance=third distance, or first distance=second distance<third distance, the artificial tooth shape is classified as square;

when the facial shape is such that first distance>second distance>third distance, or first distance<second distance<third distance, or first distance>second distance<third distance, the artificial tooth shape is classified as tapering; and when the facial form is such that first distance<second distance>third distance, the artificial tooth shape may be classified as ovoid, wherein the first distance is a distance of the first line segment connecting the endpoints on both sides of the one-third portion of the forehead area in the facial data, the second distance may be a distance of the second line segment connecting the tragus points on both sides, and the third distance may be a distance of the third line segment connecting the gonion points on both sides.

4. The facial shape classification method of claim 1, further comprising, when there are multiple classified artificial tooth shapes, providing the multiple artificial tooth shapes, receiving a specific artificial tooth shape selected from among the multiple provided artificial tooth shapes through a user action, and providing the selected artificial tooth shape.

5. The facial shape classification method of claim 1, further comprising receiving a manipulation signal based on a user action for the provided artificial tooth shape, and modifying and providing the artificial tooth shape.

6. The facial shape classification method of claim 5, wherein the modifying and providing of the artificial tooth shape comprises, when providing a first artificial tooth shape, vertically dividing the first artificial tooth shape into right and left halves while displaying a dividing line, and in response to selecting either the left half or the right half through a manipulation signal based on a user action, providing a modified artificial tooth shape in which, when the right half is selected, the right half is modified to a second artificial tooth shape, or, when the left half is selected, the left half is modified to a third artificial tooth shape.

7. The facial shape classification method of claim 5, wherein the modifying and providing of the artificial tooth shape comprises, in response to selecting a specific artificial tooth shape through a user manipulation, displaying an artificial tooth replacement list on a screen and in response to selecting a specific artificial tooth shape from the artificial tooth replacement list through a user manipulation, modifying the artificial tooth shape to the selected artificial tooth shape and providing the modified artificial tooth shape.

8. A denture design device comprising:

a data acquisition unit configured to acquire facial data of a patient;

a control unit configured to extract a plurality of landmarks from the acquired facial data, the plurality of landmarks including endpoints on both sides of a one-third portion of a forehead area, tragus points on both sides of a face, and gonion points on both sides of the face in the facial data, calculate a first distance of a first line segment connecting the endpoints on both sides of the one-third portion of the forehead area in the facial data, a second distance of a second line segment connecting the tragus points on both sides of the face, and a third distance of a third line segment connecting the gonion points on both sides of the face, classify a facial shape of the patient based on a comparison of the calculated first distance, second distance, and third distance, and classify an artificial tooth shape of the patient according to the classified facial shape; and an output unit configured to display, on a screen of the denture design device, the artificial tooth shape classified according to the classified facial shape and a simulation process conducted through the control unit of the denture design device, and output the artificial tooth shape through a three-dimensional printer.

* * * * *